Figure 1:
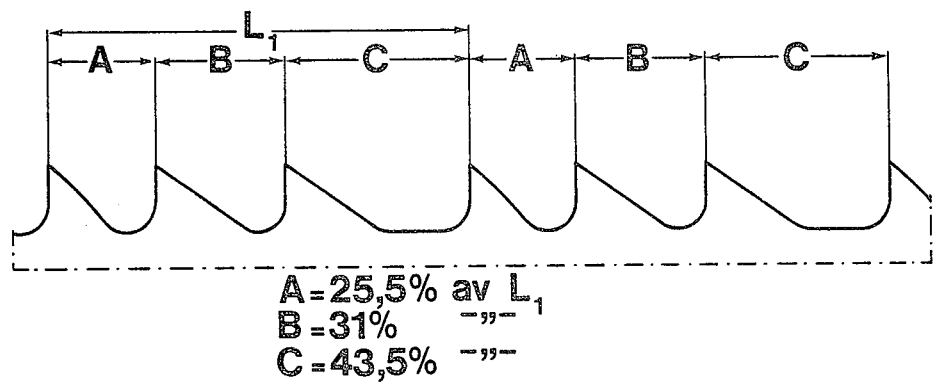

United States Patent [19]

Sundström

[11] 4,311,075
[45] Jan. 19, 1982

[54] CUTTING TOOL

[75] Inventor: Erik W. Sundström, Sandviken, Sweden

[73] Assignee: Sanvik Aktiebolag, Sandviken, Sweden

[21] Appl. No.: 170,674

[22] PCT Filed: Jan. 11, 1979

[86] PCT No.: PCT/SE79/00007
§ 371 Date: Sep. 7, 1979
§ 102(e) Date: Sep. 7, 1979

[87] PCT Pub. No.: WO79/00498
PCT Pub. Date: Aug. 9, 1979

[30] Foreign Application Priority Data

Jan. 12, 1978 [SE] Sweden ............................ 7800340

[51] Int. Cl.³ .................... B23D 57/00; B26D 1/12
[52] U.S. Cl. ......................................... 83/848; 407/61
[58] Field of Search ................ 83/835, 846, 848, 851, 83/852; 407/61

[56] References Cited

U.S. PATENT DOCUMENTS

| 154,104 | 8/1894 | Vosburgh | 83/846 |
| 156,748 | 10/1874 | Andrews | 407/61 |
| 869,182 | 10/1907 | Hotchkiss | 83/848 |
| 2,072,624 | 3/1937 | Owen | 83/848 |
| 2,720,229 | 10/1955 | Drake | 407/61 |
| 3,171,457 | 3/1965 | Brown | 83/846 |
| 3,203,072 | 8/1965 | Careje | 407/61 |
| 4,240,315 | 12/1980 | Tuomaala | 83/835 |

FOREIGN PATENT DOCUMENTS

| 21261 | 5/1946 | Finland . | |
| 42267 | 9/1926 | Norway | 83/852 |
| 67154 | 9/1925 | Sweden . | |
| 92005 | 4/1938 | Sweden . | |
| 153808 | 3/1956 | Sweden . | |

Primary Examiner—Harrison L. Hinson
Attorney, Agent, or Firm—Burns, Doane, Swecker & Mathis

[57] ABSTRACT

A cutting tool is provided with cutting elements being arranged in continuously recurrent groups comprising three or four cutting elements. These cutting elements are arranged in different distances (A, B, C, D, E, F, G) to each other which distances shall be within certain determined limits.

5 Claims, 2 Drawing Figures

A = 25,5% av L₁
B = 31% -,,-
C = 43,5% -,,-

D = 20% av L₂
E = 25% -,,-
F = 20% -,,-
G = 35% -,,-

CUTTING TOOL

This invention relates to a cutting tool for vibration-free and silent machining of wood and metals.

When machining wood and metals, two types of vibrations appear, both of which are undesirable. One type of vibrations is flexural oscillations in the tool perpendicular to the plane of the tool leading to strong noise in the tool having a frequency that corresponds to the natural frequency of the tool. The characteristic features of this type of vibrations are that the frequency acquires one of a number of fixed values, that the amplitude of vibration and the sound level vary very much when changing the number of revolutions and being small for a low number of revolutions, and that the vibrations are the most pronounced when sawing thin materials. In order to at least partially reduce this type of vibrations it has been suggested to use cutting tools made of sound damping material, or cutting tools having irregular distances between the cutting elements, wherein all distances being different or the distances being different within a recurrent group comprising at least five cutting elements.

A quite different type of vibrations are those in the plane of the cutting tool arising in consequence of the change of the feeding force, when the cutting elements enter or leave the cut. The characteristic features of this type of vibrations are that the bottom of the cut is corrugated with a characteristic wavelength, that the vibrations have one and the same amplitude already at the lowest number of revolutions and thus with an audible sound frequency which continuously grows with the number of revolutions, and that the vibrations are the most pronounced when machining material which is much thicker than the distances between the cutting elements. In order to reduce this latter type of vibrations it has been suggested that the distances between the cutting elements within a recurrent group vary according to certain rules, for instance as arithmetical or geometric series (Norwegian patent No. 45 267) or at least two equal distances followed in turn by a greater distance, at least two equal distances being different from the two former equal distances and a greater distance (Swedish patent No. 175 755).

None of the cutting tools mentioned above as prior art can satisfy the high demands that are made in the work shops today as to low sound level when machining wood and metal.

This invention relates to a cutting tool, which preferably works only in one direction. However, the invention is not limited to that but covers also cutting tools working in both directions. The cutting elements are arranged in continuously recurrent groups comprising three or four cutting elements, these cutting elements being arranged at different distances from each other which distances shall be thoroughly defined. Due to this arrangement a great reduction of the vibrations are achieved, which means a very low sound level.

Figure 2:
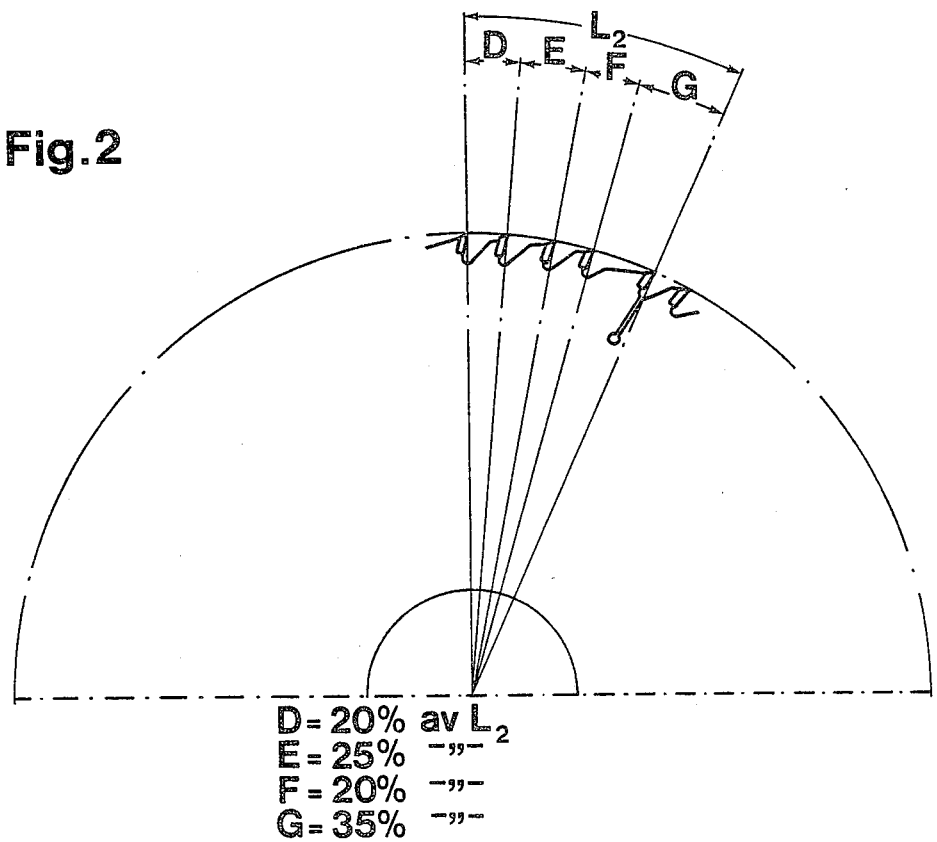

Three different embodiments of the invention for use as saw blades shall be described more closely with reference to the accompanying drawing, in which FIG. 1 is a straight saw blade with three teeth in each group, and FIG. 2 is a circular saw blade with four teeth in each group.

In FIG. 1 there is shown the first embodiment of the saw blade with the teeth divided into continuously recurrent groups and with three teeth in each group. The distances between the teeth in each group are the following in percent of the period length $L_1$, which is defined as the distance between one tooth in one group and corresponding tooth in the next group: between the first and the second tooth 25.5%, between the second and the third tooth 31% and between the third tooth and the first tooth in the next group 43.5%.

The second embodiment of the saw blade is essentially the same as the first described but has different distances between the teeth. The distances in one group in percent of the period length are the following: between the first and the second tooth 20%, between the second and the third tooth 33% and between the third tooth and the first tooth in the next group 47%.

In the two described sawblades the mutual order between the teeth in a group is arbitrary. On the other hand the same consequtive order shall be valid within all tooth groups.

In FIG. 2 there is shown a third embodiment of the saw blade which is a circular saw blade and provided with four teeth in each group. The distances between the teeth in one group in percent of the period length $L_2$ are the following: between the first and the second tooth 20%, between the second and the third 25%, between the third and fourth 20% and between the fourth and the first tooth in the next group 35%.

For all three embodiments the greatest allowed deviation for the declared distance-values is ±3%.

In a tool having the above-mentioned distances between the cutting elements sound level, tool wear and corrugation of the cut surfaces are minimized. Moreover, due to the small number of cutting elements in the recurrent group the cutting tools are relatively simple and inexpensive to resharpen in automatic machines.

The invention idea can be applied on all types of saws for machining wood, wood-based materials and metals, for instance hand saws, band saws, frame saws, yoke saws and circular saws but is not limited to such tools. Thus, the invention idea can also be applied on milling cutters for machining both wood and metals.

I claim:

1. A cutting tool having cutting elements arranged in recurrent groups of three elements, a first pair of adjacent elements in a group spaced from one another by a first distance; a second pair of adjacent elements in said group spaced from one another by a second distance; the trailing element of said group being spaced from a leading element of a subsequent group by a third distance; said first, second and third distances being all different from each other and each being expressed as a percentage of a period length of said group wherein one of said distances lies within the range of from 17 to 28.5 percent, another of said distances lies within the range of from 28 to 36 percent, and the remaining one of said distances lies within the range of from 40.5 to 50 percent.

2. A cutting tool according to claim 1, wherein said one distance lies within a range of from 22.5 to 28.5 percent; said another distance lies within a range from 28 to 34 percent; and said remaining distance lies within a range of from 40.5 to 46.5 percent, the order of said distances being consistent among all groups.

3. A cutting tool according to claim 2, wherein said one distance comprises 25.5 percent; said another distance comprises 31 percent; and said remaining distance comprises 43.5 percent.

4. A cutting tool according to claim 1, wherein said one distance lies within a range of from 17 to 23 percent; said another distance lies within a range of from 30 to 36 percent; and said remaining distance lies within a range of from 44 to 50 percent, the order of said distances being consistent among all groups.

5. A cutting tool according to claim 4, wherein said one distance comprises 20 percent; said another distance comprises 33 percent; and said remaining distance comprises 47 percent.

* * * * *